United States Patent
Saiki et al.

(10) Patent No.: US 7,456,894 B2
(45) Date of Patent: Nov. 25, 2008

(54) IMAGE PICKUP APPARATUS AND DISPLAY DEVICE

(75) Inventors: Kunihito Saiki, Tokyo (JP); Hirokazu Nakayoshi, Kanagawa (JP); Toshitake Terada, Chiba (JP); Shunichi Matsunaga, Tokyo (JP)

(73) Assignee: Sony Corporation (JP)

( * ) Notice: Subject to any disclaimer, the term of this patent is extended or adjusted under 35 U.S.C. 154(b) by 578 days.

(21) Appl. No.: 11/314,014

(22) Filed: Dec. 22, 2005

(65) Prior Publication Data
US 2006/0170806 A1     Aug. 3, 2006

(30) Foreign Application Priority Data
Jan. 17, 2005    (JP) .......................... P2005-008642

(51) Int. Cl.
*H04N 5/225* (2006.01)
*H04N 5/222* (2006.01)
*G03B 13/02* (2006.01)

(52) U.S. Cl. ................. 348/341; 348/333.09; 348/374; 348/376; 396/373

(58) Field of Classification Search ................. 348/341, 348/333.09; 396/373
See application file for complete search history.

(56) References Cited

U.S. PATENT DOCUMENTS

| | | | | |
|---|---|---|---|---|
| 5,659,376 A | * | 8/1997 | Uehara et al. | ................. 349/58 |
| 5,673,084 A | * | 9/1997 | Lim et al. | ................. 348/341 |
| 6,058,273 A | * | 5/2000 | Abe | ........................... 396/384 |
| 6,075,581 A | * | 6/2000 | Shirochi | .................... 349/112 |

FOREIGN PATENT DOCUMENTS

JP       2001-339627        12/2001

* cited by examiner

*Primary Examiner*—Ngoc-Yen T Vu
*Assistant Examiner*—Selam T Gebriel
(74) *Attorney, Agent, or Firm*—Rader Fishman & Grauer PLLC; Ronald P. Kananen

(57) ABSTRACT

An image pickup apparatus includes a case, a photographing optical system, an imaging element, and a viewfinder device. The viewfinder device includes a viewfinder case, a transmission liquid crystal panel, a lighting device, a first sheet polarizer, and a second sheet polarizer. The viewfinder case includes a case body and a case partitioning member. The lighting device and the first sheet polarizer are supported inside the case partitioning member. The transmission liquid crystal panel is supported inside the case partitioning member with the display surface faced to the window. The second sheet polarizer is supported inside the case body.

14 Claims, 7 Drawing Sheets

IMAGE PICKUP APPARATUS AND DISPLAY DEVICE

CROSS-REFERENCES TO RELATED APPLICATIONS

This application contains subject matter related to Japanese Patent Application JP 2005-008642 filed in the Japanese Patent Office on Jan. 17, 2005, the entire contents of which are incorporated herein by reference.

BACKGROUND OF THE INVENTION

1. Field of the Invention

The present invention relates to an image pickup apparatus including a viewfinder device and a display device that displays images.

2. Description of the Related Art

As an image pickup apparatus, such as a video camera, there is an image pickup apparatus including a case that constitutes an armor, a photographing optical system that is provided in the case, an imaging element that is provided in the case and images a subject image guided by the photographing optical system, and a viewfinder device that is provided in the case and is used for visually recognizing an image imaged by the imaging element from an opening of the case.

In the past, such a viewfinder device included a viewfinder case that is built in the case and in which a window is provided to face the opening. A transmission liquid crystal panel with a display surface faced to the window, a lighting device that radiates light on a rear surface of the transmission liquid crystal panel, a first sheet polarizer that is provided between the transmission liquid crystal panel and the lighting device, a second sheet polarizer that is provided between the transmission liquid crystal panel and the window, and an eyepiece that is provided between the window and the second sheet polarizer and magnifies an image displayed on the transmission liquid crystal panel are housed inside the viewfinder case (see JP-A-2001-339627).

In this case, an imaging surface of the eyepiece is provided to coincide with a liquid crystal layer of the transmission liquid crystal panel.

SUMMARY OF THE INVENTION

In recent years, there has been a demand for a reduction in size of the viewfinder device following a reduction in size of the image pickup apparatus. Therefore, a small transmission liquid crystal panel having a diagonal dimension of, for example, 0.3 inch is becoming the mainstream.

When such a small transmission liquid crystal panel is used, it may be necessary to magnify an image displayed on the transmission liquid crystal panel with the eyepiece.

On the other hand, it is inevitable that dust contaminates a material forming the first and the second sheet polarizers in a manufacturing process therefor. Therefore, a very small quantity of dust is present in the first and the second sheet polarizers. It is also inevitable that a very small quantity of dust adheres to the first and the second sheet polarizers in an assembly process for the viewfinder device.

Since the first and the second sheet polarizers are arranged near the transmission liquid crystal panel, the first and second sheet polarizers are also located near the imaging surface of the eyepiece. Therefore, an image of the dust present in or adhering to the first and the second sheet polarizers is also magnified via the eyepiece and comes into an user's view.

Consequently, there is apprehension that, as a size of the transmission liquid crystal panel is further reduced and a magnification of an image by the eyepiece is increased, the image of the dust displayed by the viewfinder device becomes more conspicuous.

To solve such an inconvenience, it is conceivable to arrange the first and second sheet polarizers in a place apart from the imaging surface of the eyepiece.

However, in the past, the first and second sheet polarizers and the transmission liquid crystal panel often have been integrally supported by a single support member. Thus, an arrangement relation between the first and the second sheet polarizers is fixed.

As a result, a degree of freedom of design is limited in arranging the first and the second sheet polarizers in places apart from the imaging surface of the eyepiece to prevent the dust on the first and second sheet polarizers from becoming conspicuous in the user's view while reducing a space occupied by the viewfinder device. In addition, there is a disadvantage in that a degree of freedom of design is also limited in securing a movement amount for moving the eyepiece in an optical axis direction thereof to adjust a diopter scale.

It is desirable to provide an image pickup apparatus and a display device that are advantageous for realizing a reduction in size and securing a degree of freedom of design while preventing an image of dust from becoming conspicuous.

According to an embodiment of the invention, there is provided an image pickup apparatus including a case that constitutes an armor, a photographing optical system that is provided in the case, an imaging element that is provided in the case and images a subject image guided by the photographing optical system, and a viewfinder device that is provided in the case and is used for visually recognizing an image imaged by the imaging element from an opening of the case. The viewfinder device includes a viewfinder case that is built in the case, a transmission liquid crystal panel that has a display surface on which an image is displayed, a lighting device that irradiates light on a rear surface on the opposite side of the display surface of the transmission liquid crystal panel, a first sheet polarizer that is provided between the transmission liquid crystal panel and the lighting device, and a second sheet polarizer that is provided to be faced to the display surface of the transmission liquid crystal panel. The viewfinder case includes a case body in which a window is provided to face the opening and a case partitioning member that is attached to the case body. The lighting device and the first sheet polarizer are supported inside the case partitioning member. The transmission liquid crystal panel is supported inside the case partitioning member with the display surface faced to the window. The second sheet polarizer is supported inside the case body.

According to another embodiment of the invention, there is provided a display device including a case, a transmission liquid crystal panel that has a display surface on which an image is displayed, a lighting device that irradiates light on a rear surface on the opposite side of the display surface of the transmission liquid crystal panel, a first sheet polarizer that is provided between the transmission liquid crystal panel and the lighting device, and a second sheet polarizer that is provided so as to be faced to the display surface of the transmission liquid crystal panel. The case includes a case body in which a window for a peep is provided and a case partitioning member that is attached to the case body. The lighting device and the first sheet polarizer are supported inside the case partitioning member. The transmission liquid crystal panel is supported inside the case partitioning member with the display surface faced to the window. The second sheet polarizer is supported inside the case body.

DESCRIPTION OF THE PREFERRED EMBODIMENTS

Embodiments of the present invention will be explained hereinafter in detail with reference to the accompanying drawings.

A first embodiment of the invention will be explained with reference to the drawings.

In this embodiment, an image pickup apparatus is a video camera 100.

Figure 1:
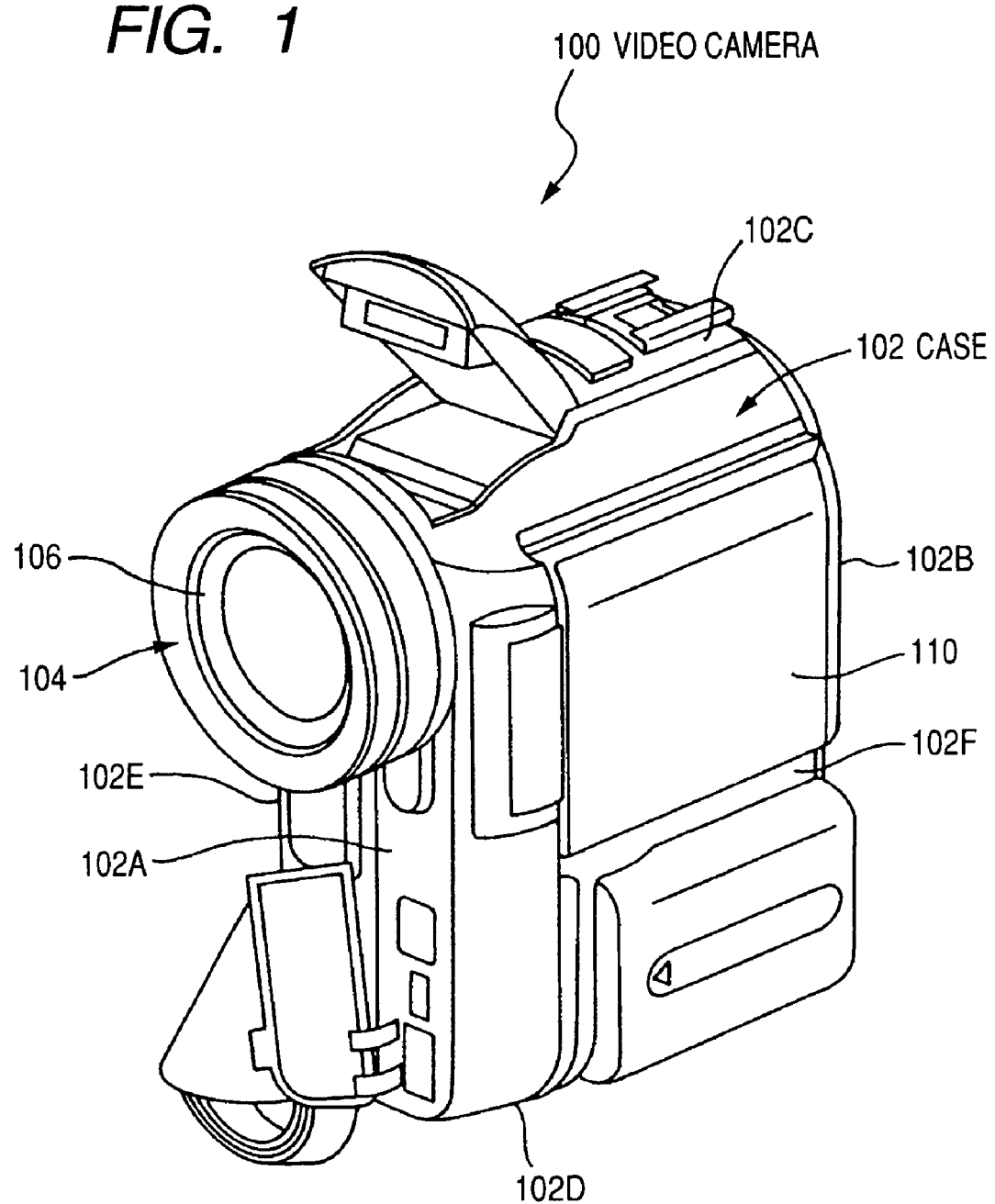
FIG. 1 is a perspective view of a video camera 100 in a first embodiment of the invention viewed from the front.
Figure 2:
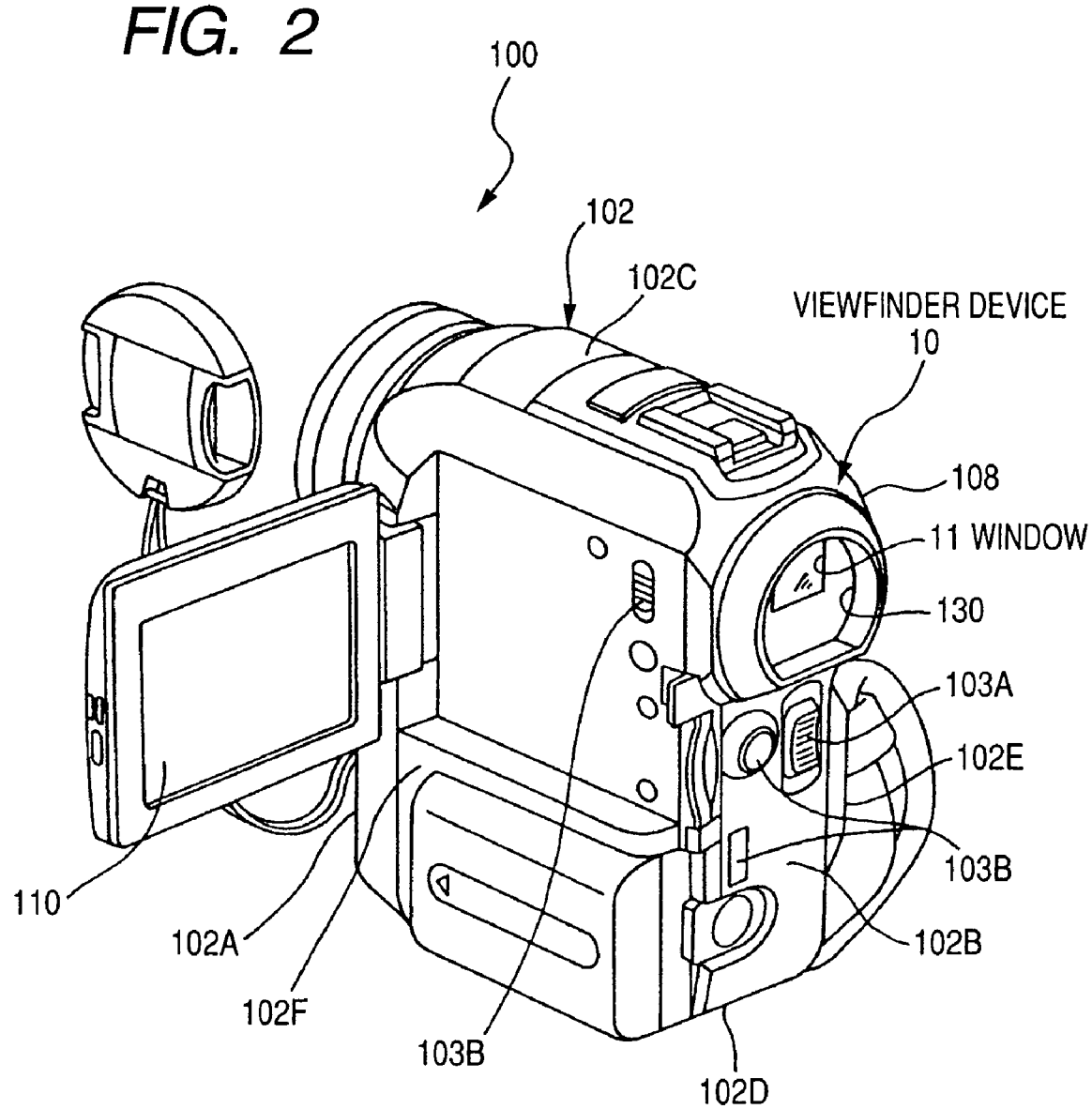
FIG. 2 is a perspective view of the video camera 100 viewed from the rear.

FIG. 1 is a perspective view of the video camera 100 viewed from the front. FIG. 2 is a perspective view of the video camera 100 viewed from the rear.

Figure 3:
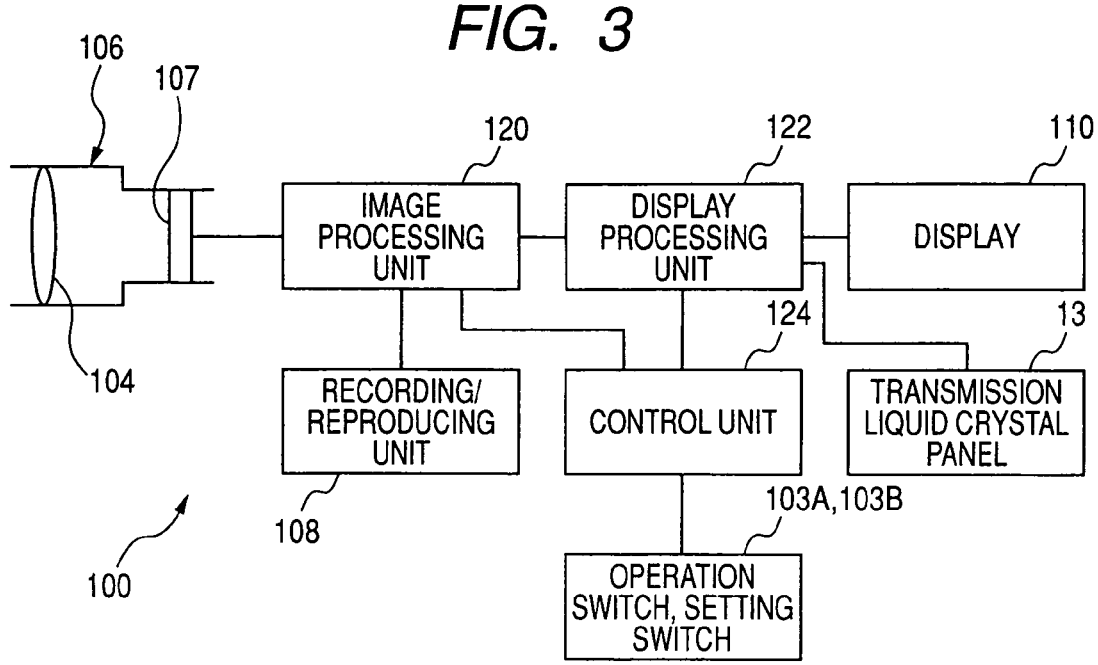
FIG. 3 is a block diagram showing a constitution of a control system of the video camera 100.

FIG. 3 is a block diagram showing a constitution of a control system of the video camera 100.

Figure 4:
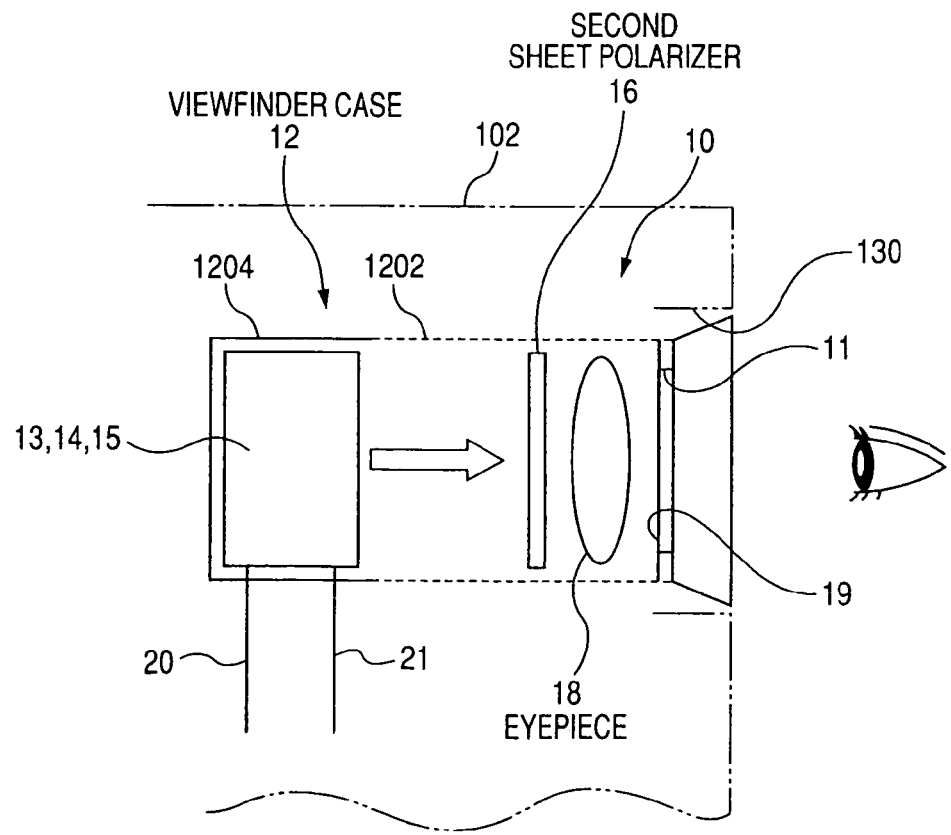
FIG. 4 is a diagram for explaining a constitution of a viewfinder device 10 of the video camera 100.
Figure 5:
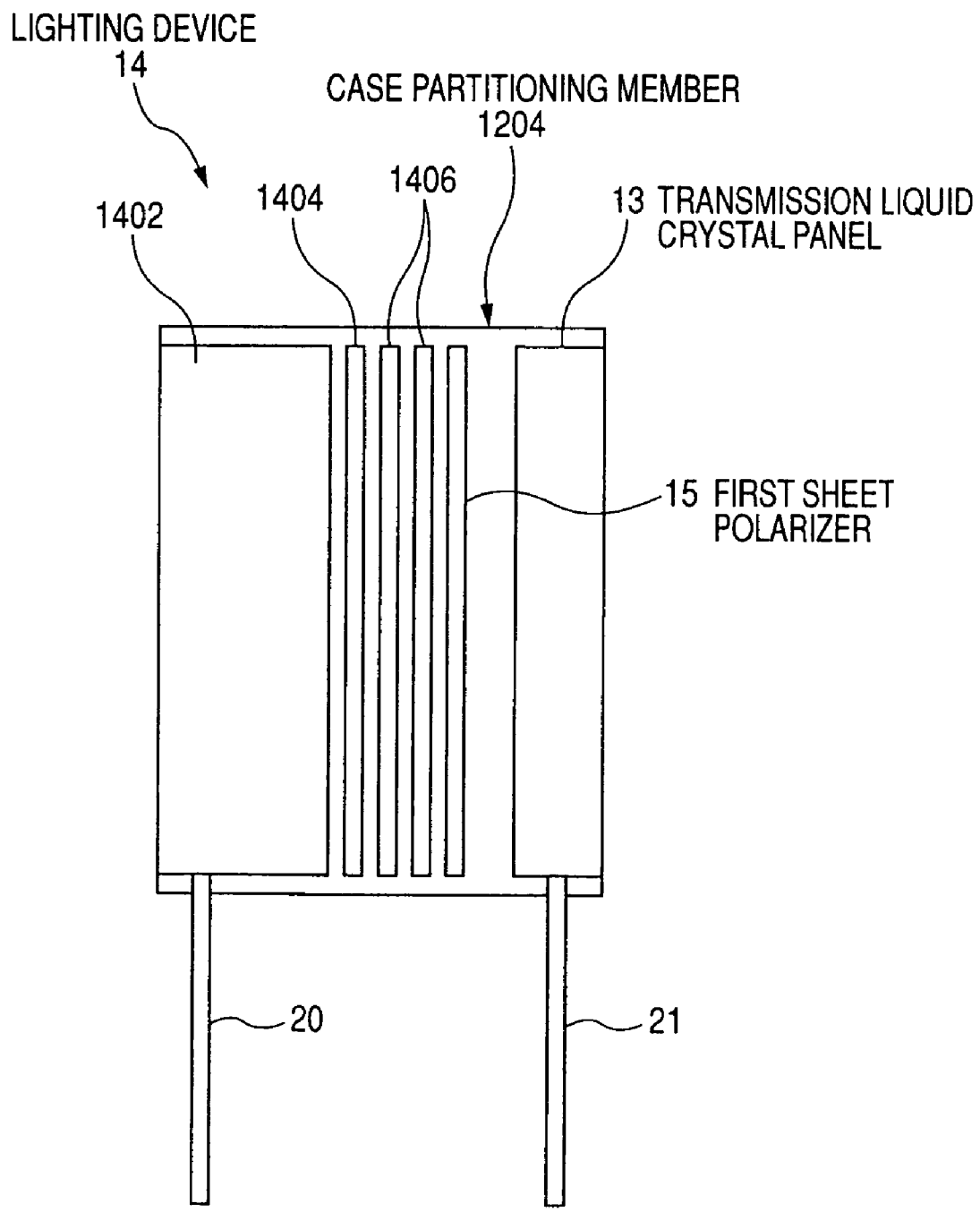
FIG. 5 is a diagram for explaining a main part in FIG. 4.

FIG. 4 is a diagram for explaining a constitution of a viewfinder device 10 of the video camera 100. FIG. 5 is a diagram for explaining a main part in FIG. 4.

As shown in FIGS. 1 to 3, in this embodiment, the video camera 100 includes a case 102 that constitutes an armor, a photographing optical system 104 that is provided in the case 102 so as to face forward, an imaging element 107 that is built in the case 102 and images a subject image guided by the photographing optical system 104, and the viewfinder device 10 for visually recognizing an image imaged by the imaging element 107.

In this specification, the left and the right means the left and the right in a state in which the video camera 100 is viewed from the front. A subject side in an optical axis direction of a photographing optical system is referred to as the front, and the imaging element 107 side is referred to as the rear.

The case 102 has a width in a left to right direction, a height in an up to down direction larger than the width, and a length in a front to rear direction larger than the height.

The case 102 has a front surface 102A and a rear surface 102B facing the front and the rear, an upper surface 102C and a lower surface 102D facing upward and downward, and a left side surface 102E and a right side surface 102F facing the left and the right.

An operation switch 103A, such as a photographing start/stop switch, and a plurality of setting switches 103B for performing various kinds of setting are provided on the rear surface 102B and the right side surface 102F of the case 102.

A lens barrel 106 is arranged in an upper part in the case 102. The photographing optical system 104 is arranged in the lens barrel 106. The imaging element 107 (FIG. 3) is arranged at a rear end in the lens barrel 106.

A recording/reproducing unit 108 or the like that records data of a still image and a moving image of a subject image imaged by the imaging element 107 in a recording medium (e.g., a magnetic tape, an optical disk, or a magneto-optical disk) and reproduces the data from the recording medium are arranged on the left side surface 102E side in the case 102.

A display device 110 for displaying a subject image and the like imaged by the imaging element 107 is provided on the right side surface 102F of the case 102 so as to be capable of opening and closing.

As shown in FIG. 3, the imaging element 107 is constituted by a CCD, a CMOS sensor, or the like that images a subject image focused by the photographing optical system 104.

An image imaged by the imaging element 107 is outputted to an image processing unit 120 as an imaging signal. The image processing unit 120 generates image data of a still image or a moving image on the basis of the imaging signal. The recording/reproducing unit 108 records the image data in the recording medium and reproduces the image data from the recording medium.

A display processing unit 122 displays the image data on the display device 110 and a transmission liquid crystal panel 13 of the viewfinder device 10 (equivalent to a display device in the claims).

The imaging device 100 also includes a control unit 124 which includes a CPU and the like which controls the image processing unit 120 and the display processing unit 122 in response to the operation of an operation switch 103A and a setting switch 103B.

It is also possible to provide a card slot to which a memory card is attached and from which the memory card is detached, and the image processing unit 120 records data of a still image and a moving image in the memory card attached to the card slot, and the recording/reproducing unit 108 reproduces image data from the memory card.

As shown in FIG. 2, an opening 130 is provided in an upper part of the rear surface 102B of the case 102. The viewfinder device 10 is built in an upper part of the case 102 to allow an user to visually recognize an image from the opening 130.

As shown in FIGS. 4 and 5, the viewfinder device 10 includes a viewfinder case 12, the transmission liquid crystal panel 13, a lighting device 14, a first sheet polarizer 15, and a second sheet polarizer 16.

The viewfinder case 12 is built in the case 102 and includes a case body 1202 and a case partitioning member 1204.

In this embodiment, the case body 1202 is attached to the case 102. A window 11 is provided in the case body 1202 so as to face the opening 130.

The case partitioning member 1204 is attached to the case body 1202.

The transmission liquid crystal panel 13, the lighting device 14, and the first sheet polarizer 15 are supported inside the case partitioning member 1204.

The second sheet polarizer 16 is supported in the case body 1202.

The transmission liquid crystal panel 13 is arranged so as to be located in front of the window 11 and displays an image in the window 11.

The transmission liquid crystal panel 13 includes two transparent substrates laid one on top of the other, a liquid crystal layer made of liquid crystal sealed between the two transparent substrates, and transparent electrodes that are formed in places of the respective transparent substrates facing the liquid crystal layer. The transmission liquid crystal panel 13 changes an array of molecules of the liquid crystal according to an image to be displayed to change a direction of linear polarized light transmitted through the transmission liquid crystal panel 13 by 90 degrees on the basis of a driving signal supplied from the display processing unit 122 to the transparent electrodes.

In the transmission liquid crystal panel 13, an image is displayed on a surface of the liquid crystal layer facing the transparent substrates. Therefore, the surface is a display surface.

The lighting device 14 is provided in front of the transmission liquid crystal panel 13 with the window 11 as a reference. The lighting device 14 is provided as a so-called backlight on a rear surface that is a surface on an opposite side of the display surface of the transmission liquid crystal panel 13.

In this embodiment, the lighting device 14 includes a light source 1402 including a LED, a diffuser 1404 that evenly diffuses light irradiated from the light source 1402, and a condensing plate 1406 that guides the light diffused by the diffuser 1404 to the first sheet polarizer 15.

The first sheet polarizer 15 is provided between the rear surface of the transmission liquid crystal panel 13 and the lighting device 14.

The first sheet polarizer 15 has a transmission axis that extends along a surface orthogonal to a traveling direction of the light irradiated from the lighting device 14. Therefore, the light transmitted through the first sheet polarizer 15 is changed to linear polarized light parallel to the transmission axis of the first sheet polarizer 15.

The second sheet polarizer 16 is provided between the transmission liquid crystal panel 13 and the window 11.

The second sheet polarizer 16 has a transmission axis that extends along a surface orthogonal to a traveling direction of the light irradiated from the lighting device 14 and transmitted through the transmission liquid crystal panel 13 and crosses the transmission axis of the first sheet polarizer 15 at an angle of 90 degrees. Therefore, linear polarized light, a direction of which is changed 90 degrees by the transmission liquid crystal panel 13, is transmitted through the second sheet polarizer 16, and linear polarized light, the direction of which is not changed 90 degrees by the transmission liquid crystal panel 13, is not transmitted through the second sheet polarizer 16. Since light is transmitted or is not transmitted through the transmission liquid crystal panel 13, an image is formed on the transmission liquid crystal panel 13.

In this embodiment, inside the case body 1202, an eyepiece 18 that magnifies the image formed on the transmission liquid crystal panel 13 is provided between the window 11 and the transmission liquid crystal panel 13, in other words, between the window 11 and the second sheet polarizer 16.

The eyepiece 18 is provided such that an imaging surface thereof substantially coincides with the display surface of the transmission liquid crystal panel 13.

In this embodiment, a protection plate 19 made of a transparent material which transmits light is fit in the window 11 in order to prevent dust from entering the viewfinder case 12 from the window 11.

In FIG. 5, reference numeral 20 denotes a flexible substrate for supplying an electric current to the light source 1402 and reference numeral 21 denotes a flexible substrate for supplying the driving signal to the transparent electrodes of the transmission liquid crystal panel 13.

According to this embodiment, the viewfinder case 12 includes the case body 1202 and the case partitioning member 1204 attached to the case body 1202, the transmission liquid crystal panel 13, the lighting device 14, and the first sheet polarizer 15 that are supported inside the case partitioning member 1204, and the second sheet polarizer 16 that is supported inside the case body 1202. Thus, it is possible to set an arrangement position of the first sheet polarizer 15 and an arrangement position of the second sheet polarizer 16 freely and independently from each other.

This is advantageous for securing a degree of freedom of design in arranging the first and the second sheet polarizers 15 and 16 in a place apart from the imaging surface of the eyepiece 18 so as to prevent dust on the first and the second sheet polarizers 15 and 16 from becoming conspicuous in an user's view while reducing a space occupied by the viewfinder device 10.

It is possible to set an arrangement position of the first sheet polarizer 15 and an arrangement position of the second sheet polarizer 16 freely and independently from each other. This is advantageous for securing a degree of freedom of design in securing a movement space in the optical axis direction of the eyepiece 18 when the eyepiece 18 is made movable in an optical axis direction to adjust a diopter scale.

Since dust on the first and second sheet polarizers 15 and 16 is prevented from becoming conspicuous in an user's view, it is possible to realize an improvement of performance of the viewfinder device 10 and to relax an allowable amount of dust contaminating or adhering to the first and second sheet polarizers 15 and 16. This is advantageous for realizing a reduction in the manufacturing cost.

The first embodiment will be explained in comparison with a comparative example.

Figure 6:
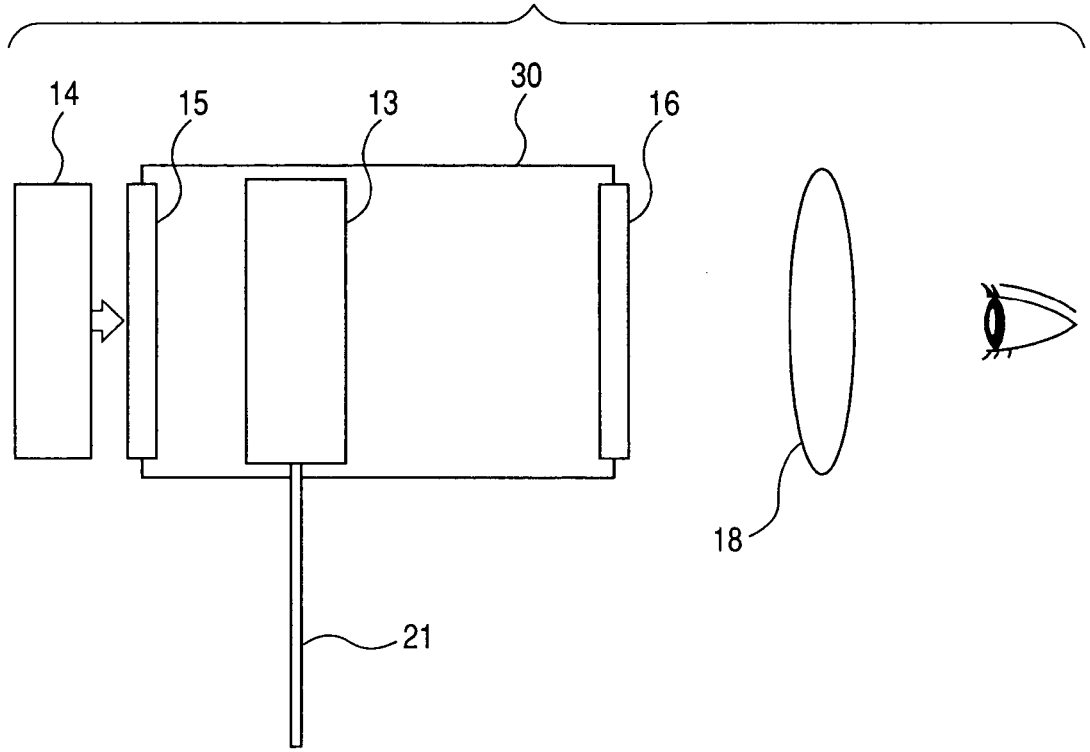
FIG. 6 is a diagram of a viewfinder device 10A used in the past.

FIG. 6 is a diagram of a viewfinder device 10A used in the past. In FIG. 6, components and members that are the same as those in the first embodiment are denoted by identical reference numerals. Explanations of the components and members are omitted.

As shown in FIG. 6, in the viewfinder device 10A in the comparative example, the first and the second sheet polarizers 15 and 16 and the transmission liquid crystal panel 13 are integrally supported by a single support member 30.

Therefore, since an arrangement position of the first sheet polarizer 15 and an arrangement position of the second sheet polarizer 16 are fixed, it is difficult to set the arrangement of the first and the second sheet polarizers 15 and 16 freely according to the design of eyepiece 18. This is disadvantageous for reducing a space occupied by the viewfinder device 10A.

This is also disadvantageous for securing a degree of freedom of design in securing a movement space in the optical axis direction of the eyepiece 18, when the eyepiece 18 is made movable in an optical axis direction to adjust a diopter scale because an arrangement position of the first sheet polarizer 15 and an arrangement position of the second sheet polarizer 16 are fixed.

On the other hand, in this embodiment, it is possible to set an arrangement position of the first sheet polarizer 15 and an arrangement position of the second sheet polarizer 16 freely and independently from each other. Thus, it is possible to secure a degree of freedom of design. This embodiment is advantageous in this point compared with the comparative example.

A second embodiment of the invention will be explained.

Figure 7:
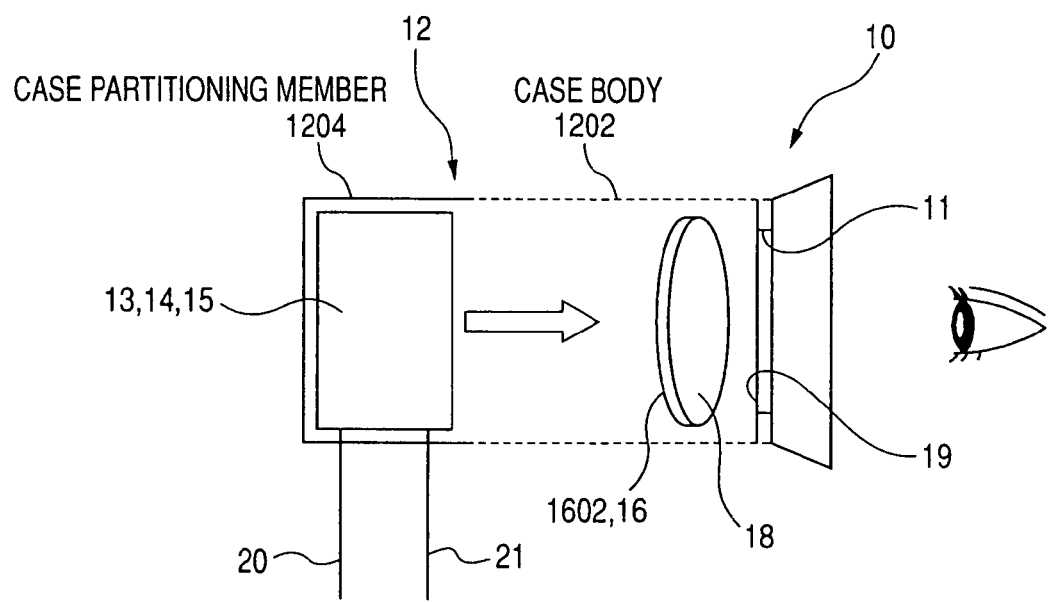
FIG. 7 is a diagram for explaining a constitution of the viewfinder device 10 in a second embodiment of the invention.

FIG. 7 is a diagram for explaining a constitution of the viewfinder device 10 in the second embodiment. In the following description, components and members that are the same as those in the first embodiment are denoted by identical reference numerals. Explanations of the components and the members are omitted.

The second embodiment is a modification of the first embodiment. A sheet polarizer 1602 is provided on at least one of a lens surface of the eyepiece 18 facing the window 11 and a lens surface of the eyepiece 18 facing the transmission liquid crystal panel 13.

The sheet polarizer 1602 is constituted by, for example, coating a polarizing film over the lens surface or sticking a thin polarizing film over the lens surface.

The sheet polarizer 1602 constitutes the second sheet polarizer 16.

It goes without saying that the second embodiment realizes the same advantage as the first embodiment. Moreover, it is possible to reduce the number of components compared with the first embodiment because the second sheet polarizer 16 is not separately provided. This is advantageous for reducing the manufacturing cost.

A third embodiment of the invention will be explained.

Figure 8:
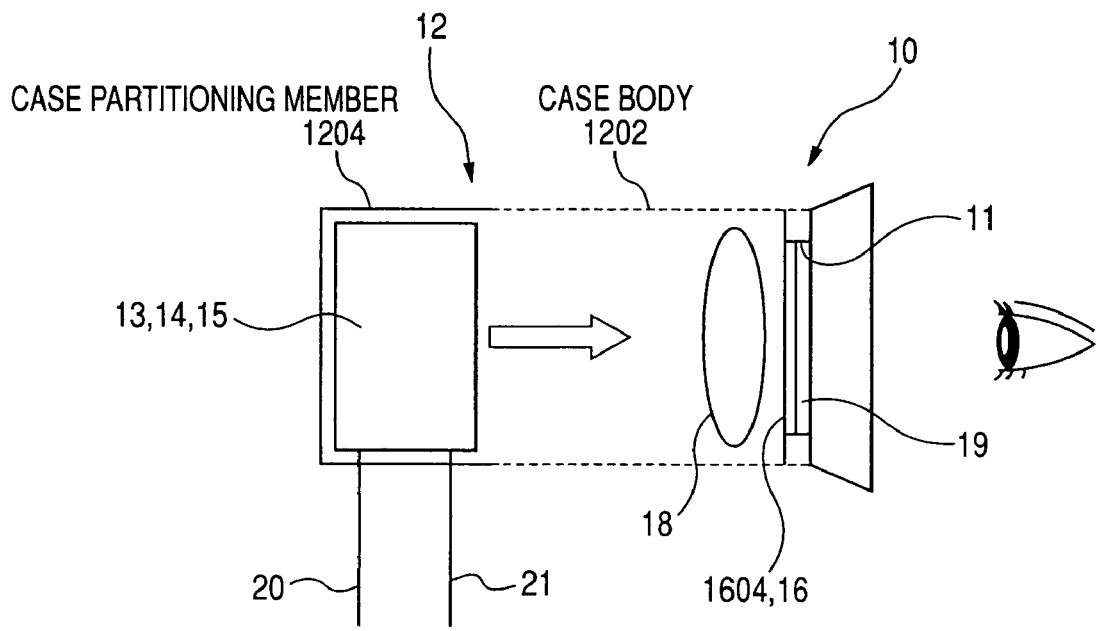
FIG. 8 is a diagram for explaining a constitution of the viewfinder device 10 in a third embodiment of the invention.

FIG. 8 is a diagram for explaining a constitution of the viewfinder device 10 in the third embodiment.

The third embodiment is also a modification of the first embodiment. A sheet polarizer 1604 is provided on a surface of the protection plate 19 facing backward from the window 11 or a surface of the protection plate 19 facing the transmission liquid crystal panel 13.

The sheet polarizer 1602 is constituted by, for example, coating a polarizing film over the surface of the protection plate 19 or sticking a thin polarizing film to the protection plate 19.

The sheet polarizer 1604 constitutes the second sheet polarizer 16.

It goes without saying that the third embodiment realizes the same advantage as the first embodiment. Moreover, it is possible to reduce the number of components compared with the first embodiment because the second sheet polarizer 16 is not separately provided. This is advantageous for reducing the manufacturing cost.

A fourth embodiment of the invention will be explained.

The fourth embodiment is different from the first embodiment in that a reflecting mirror 20 for deflecting an optical path of the viewfinder device 10 is provided.

Figure 9:
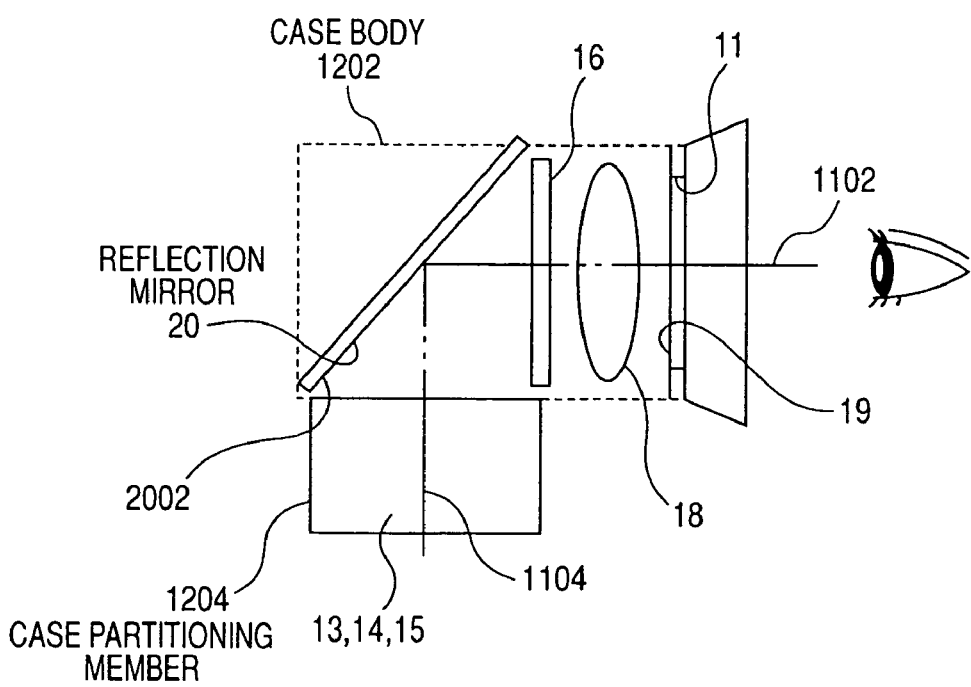
FIG. 9 is a diagram for explaining a constitution of the viewfinder device 10 in a fourth embodiment of the invention.
Figure 10A:
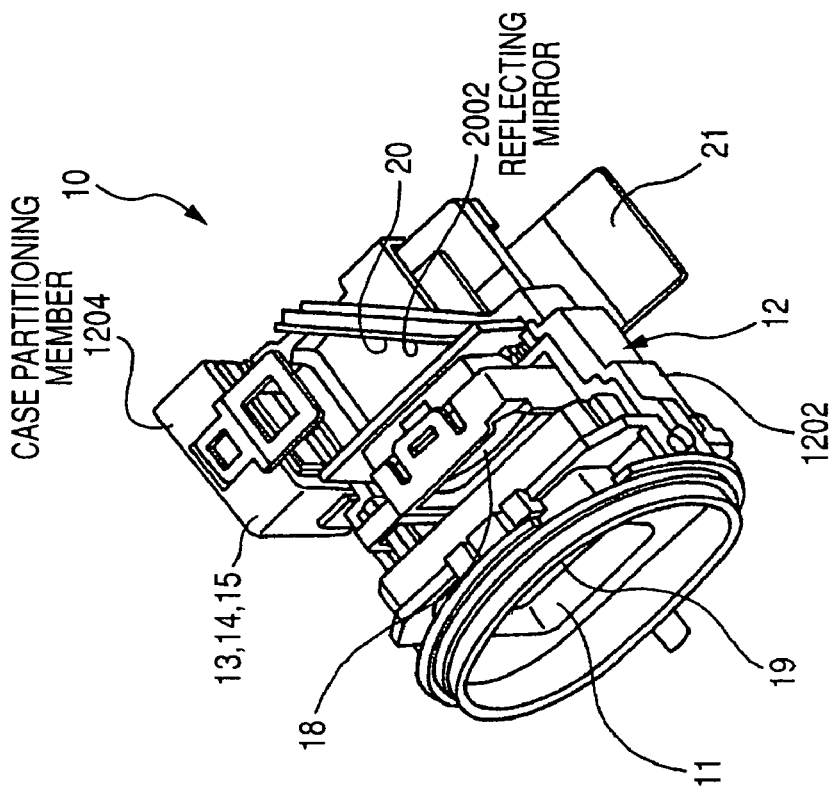
FIGS. 10A and 10B are perspective views showing a state in which a part of a case body 1202 of the viewfinder device 10 in the fourth embodiment is fractured.
Figure 10B:
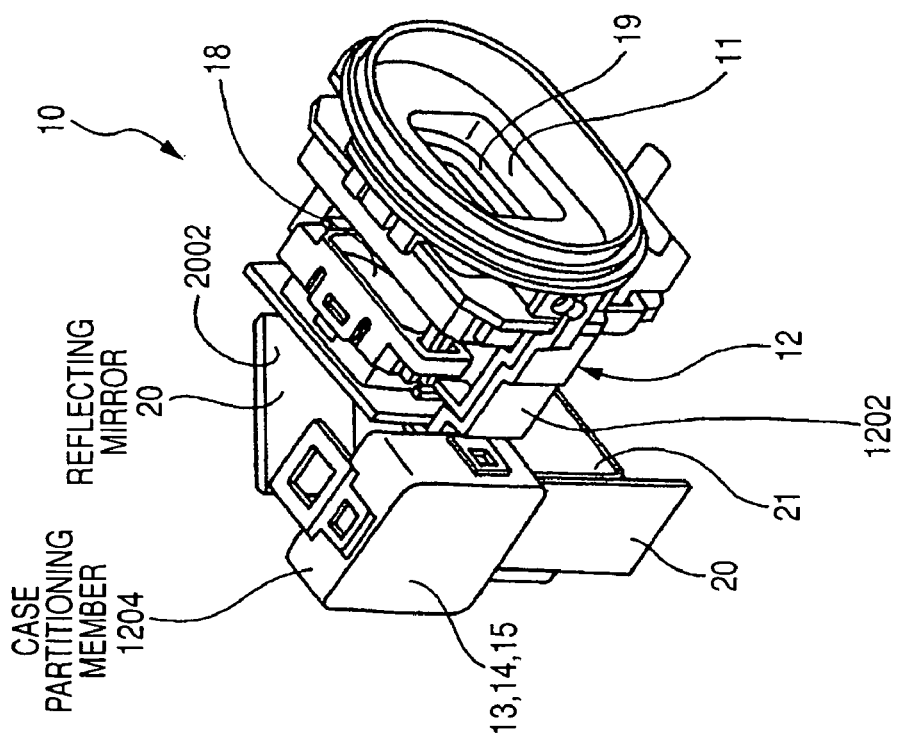

FIG. 9 is a diagram for explaining a constitution of the viewfinder device 10 in the fourth embodiment. FIGS. 10A and 10B are perspective views showing a state in which a part of the case body 1202 of the viewfinder device 10 in the fourth embodiment is fractured.

As shown in FIG. 9 and FIGS. 10A and 10B, a first optical path 1102 that extends forward from the window 11 is provided inside the case body 1202. A second optical path 1104 that bends at a right angle from a front end of the first optical path 1102 and extends to the right side is provided from the inside in a front part of the case body 1202 to the inside of the case partitioning member 1204.

The protection plate 19, the eyepiece 18, the second sheet polarizer 16, and the reflecting mirror 20 are arranged in a linear shape in the first optical path 1102.

The reflecting mirror 20 reflects an image displayed on the transmission liquid crystal panel 13 backward. The reflecting mirror 20 is arranged in a part where the first optical path 1102 and the second optical path 1104 cross each other.

The reflecting mirror 20 is arranged such that a reflecting surface 2002 thereof is extended in the up to down direction and crosses the front to rear direction at an angle of 45 degrees. Various publicly-known reflecting mirrors such as a reflecting mirror with a metal film formed on a flat glass plate and a reflecting mirror constituted by surfaces of a prism, may be adopted as the reflecting mirror 20.

The case partitioning member 1204 is attached to the case body 1202 so as to face the right side of the reflecting mirror 20.

A display surface of the transmission liquid crystal panel 13 supported in the case partitioning member 1204, on which an image is displayed, is orthogonal to the second optical path 1104.

Therefore, when an image imaged by the imaging element 107 is displayed on the transmission liquid crystal panel 13, the image is visually recognized in the window 11 through the reflecting mirror 20, the second sheet polarizer 16, the eyepiece 18, and the protection plate 19.

Since the image is visually recognized after being reflected by the reflecting mirror 20, it may be necessary to display the image on the transmission liquid crystal panel 13 as a mirror image.

It goes without saying that the fourth embodiment realizes the same advantage as the first embodiment. Moreover, it is possible to set an arrangement position of the first sheet polarizer 15 and an arrangement position of the second sheet polarizer 16 freely and independently from each other. Thus, it is possible to arrange the reflecting mirror 20 in the optical path of the viewfinder device 10 to deflect the optical path and secure an optical path length in the viewfinder device 10 in, for example, the left to right direction as well.

Therefore, it is possible to reduce a dimension in the front to rear direction of the viewfinder device 10, secure a degree of freedom of arrangement of the various members in the case 102, and realize a reduction in size in the front to rear direction of the video camera 100.

It goes without saying that, in the fourth embodiment, the second sheet polarizer 16 may be provided in the eyepiece 18 or the protection plate 19 as in the second and the third embodiments.

The second sheet polarizer 16 may be provided in the reflection mirror 20 by coating a polarizing film on the reflecting surface 2002 of the reflecting mirror 20 or sticking a thin polarizing film on the reflecting surface 2002 of the reflecting mirror 20.

According to an image pickup apparatus and a display device in embodiments of the invention, a viewfinder case or a case for a display device includes a case body and a case partitioning member that is attached to the case body. A transmission liquid crystal panel, a lighting device, and a first sheet polarizer are supported inside the case partitioning member. A second sheet polarizer is supported inside the case body. Thus, it is possible to set an arrangement position of the first sheet polarizer and an arrangement position of the second sheet polarizer freely and independently from each other.

This is advantageous for securing a degree of freedom of design in arranging the first and the second sheet polarizers to prevent dust on the first and second sheet polarizers from becoming conspicuous in an user's view while reducing a space occupied by the viewfinder device or the display device.

In the explanations of the embodiments, the image pickup apparatus is the video camera. However, it goes without saying that the image pickup apparatus of the invention is not limited to this, and it may be various image pickup apparatuses, such as a digital still camera.

Moreover, in the explanations of the embodiments, the display device is the viewfinder device of the image pickup apparatus. However, it goes without saying that the display device of the invention is not limited to this, and the invention is widely applicable to various display devices that display images.

What is claimed is:

1. An image pickup apparatus comprising:
    a case that constitutes an armor;
    a photographing optical system that is provided in the case;
    an imaging element that is provided in the case and images a subject image guided by the photographing optical system; and
    a viewfinder device that is provided in the case and is used for visually recognizing an image imaged by the imaging element from an opening of the case,
    wherein the viewfinder device includes
        a viewfinder case that is built in the case,
        a transmission liquid crystal panel that has a display surface on which an image is displayed,
        a lighting device that irradiates light on a rear surface on an opposite side of the display surface of the transmission liquid crystal panel,
        a first sheet polarizer that is provided between the transmission liquid crystal panel and the lighting device, and
        a second sheet polarizer that is provided to be faced to the display surface of the transmission liquid crystal panel,
    the viewfinder case includes
        a case body in which a window is provided to face the opening, and
        a case partitioning member that is attached to the case body,
    the lighting device and the first sheet polarizer are supported inside the case partitioning member,
    the transmission liquid crystal panel is supported inside the case partitioning member with the display surface faced to the window, and
    the second sheet polarizer is supported inside the case body.

2. An image pickup apparatus according to claim 1, wherein an eyepiece that magnifies the image is provided between the window and the transmission liquid crystal panel inside the case body.

3. An image pickup apparatus according to claim 1, wherein
    an eyepiece that magnifies the image is provided between the window and the transmission liquid crystal panel inside the case body, and
    the second sheet polarizer is attached to at least one of a lens surface of the eyepiece facing the window or a lens surface of the eyepiece facing the transmission liquid crystal panel.

4. An image pickup apparatus according to claim 1, wherein a protection plate that prevents dust from entering the viewfinder case from the window is attached to the window.

5. An image pickup apparatus according to claim 1, wherein
    a protection plate that prevents dust from entering the viewfinder case from the window is attached to the window, and
    the second sheet polarizer is attached to the protection plate.

6. An image pickup apparatus according to claim 1, wherein
    the case body extends in a front to rear direction,
    the case partitioning member is coupled to a left or a right side in a front part of the case body, and
    a reflecting mirror that reflects an image displayed on the transmission liquid crystal panel to the second sheet polarizer is provided in a front part of an inside of the case body in front of the second sheet polarizer.

7. An image pickup apparatus according to claim 1, wherein the case body is attached to the case.

8. A display device comprising:
    a case;
    a transmission liquid crystal panel that has a display surface on which an image is displayed;
    a lighting device that irradiates light on a rear surface on the opposite side of the display surface of the transmission liquid crystal panel;
    a first sheet polarizer that is provided between the transmission liquid crystal panel and the lighting device; and
    a second sheet polarizer that is provided to be faced to the display surface of the transmission liquid crystal panel,
    wherein the case includes
        a case body in which a window for a peep is provided, and
        a case partitioning member that is attached to the case body,
    the lighting device and the first sheet polarizer are supported inside the case partitioning member,
    the transmission liquid crystal panel is supported inside the case partitioning member with the display surface faced to the window, and
    the second sheet polarizer is supported inside the case body.

9. A display device according to claim 8, wherein an eyepiece that magnifies the image is provided between the window and the transmission liquid crystal panel inside the case body.

10. A display device according to claim 8, wherein
    an eyepiece that magnifies the image is provided between the window and the transmission liquid crystal panel inside the case body, and
    the second sheet polarizer is attached to at least one of a lens surface of the eyepiece facing the window or a lens surface of the eyepiece facing the transmission liquid crystal panel.

11. A display device according to claim 8, wherein a protection plate that prevents dust from entering the case from the window is attached to the window.

12. A display device according to claim 8, wherein
a protection plate that prevents dust from entering the case from the window is attached to the window, and
the second sheet polarizer is attached to the protection plate.

13. A display device according to claim 8, wherein
the case body extends in a front to rear direction,
the case partitioning member is coupled to a left or a right side in a front part of the case body, and
a reflecting mirror that reflects an image displayed on the transmission liquid crystal panel to the second sheet polarizer is provided in a front part of an inside of the case body in front of the second sheet polarizer.

14. A display device according to claim 8, wherein the display device is a viewfinder device of an image pickup apparatus that displays an image imaged by an imaging element.

* * * * *